(12) United States Patent
Jung et al.

(10) Patent No.: US 12,430,144 B2
(45) Date of Patent: Sep. 30, 2025

(54) ELECTRONIC DEVICE AND APPLICATION EXECUTION METHOD FOR ELECTRONIC DEVICE

(71) Applicant: SAMSUNG ELECTRONICS CO., LTD., Suwon-si (KR)

(72) Inventors: Kwanjin Jung, Suwon-si (KR); Daehyun Cho, Suwon-si (KR); Wonseo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 18/196,674

(22) Filed: May 12, 2023

(65) Prior Publication Data

US 2023/0281021 A1    Sep. 7, 2023

Related U.S. Application Data

(63) Continuation of application No. PCT/KR2021/015038, filed on Oct. 25, 2021.

(30) Foreign Application Priority Data

Nov. 12, 2020  (KR) .................. 10-2020-0150981

(51) Int. Cl.
   *G06F 9/445*   (2018.01)
   *G06F 3/14*    (2006.01)

(52) U.S. Cl.
   CPC ........ *G06F 9/44521* (2013.01); *G06F 3/1423* (2013.01)

(58) Field of Classification Search
   CPC .................... G06F 9/44521; G06F 3/1423
   See application file for complete search history.

(56) References Cited

U.S. PATENT DOCUMENTS 8,892,731 B2   11/2014   Oki et al.
8,934,944 B2    1/2015   Sato
(Continued)

FOREIGN PATENT DOCUMENTS

CN   105452983 A    3/2016
CN   108647052 A   10/2018
(Continued)

OTHER PUBLICATIONS

Communication dated Feb. 20, 2024 issued by the European Patent Office in European Application No. 21892189.8.
(Continued)

*Primary Examiner* — Stephen S Hong
*Assistant Examiner* — Darrin Hope
(74) *Attorney, Agent, or Firm* — Sughrue Mion, PLLC

(57) ABSTRACT

An electronic device comprises a processor configured to launch a first application, display a launch screen of the first application on a first display, determine a second application expected to be launched on at least one of the first display or a second display, based on a determination a specified trigger condition is satisfied, perform a pre-loading process of one or more resources, generate, based on the pre-loaded one or more resources, a launch screen of the second application in a virtual window, and based on a determination a screen switch event occurs with respect to the launch screen of the first application, display the launch screen of the second application generated in the virtual window on at least one display corresponding to the screen switch event among the first display and the second display, thereby completing launching of the second application.

20 Claims, 9 Drawing Sheets

(56) References Cited

U.S. PATENT DOCUMENTS

| | | |
|---|---|---|
| 9,413,848 B2 | 8/2016 | Oki et al. |
| 10,466,856 B2 | 11/2019 | Shin et al. |
| 10,922,094 B2 | 2/2021 | Morris et al. |
| 11,042,192 B2 | 6/2021 | Choi et al. |
| 11,416,037 B2 | 8/2022 | Choi et al. |
| 11,630,487 B2 | 4/2023 | Choi et al. |
| 11,886,252 B2 | 1/2024 | Kim et al. |
| 2008/0117202 A1 | 5/2008 | Martinez et al. |
| 2009/0024452 A1 | 1/2009 | Martinez et al. |
| 2011/0037711 A1 | 2/2011 | Siddiqui et al. |
| 2012/0154341 A1 | 6/2012 | Chan et al. |
| 2014/0215497 A1* | 7/2014 | Guo .................. G06F 9/5094 719/320 |
| 2014/0289741 A1 | 9/2014 | Yura et al. |
| 2015/0338888 A1 | 11/2015 | Kim et al. |
| 2016/0357808 A1 | 12/2016 | Morris et al. |
| 2018/0329508 A1* | 11/2018 | Klein .................. G06F 3/011 |
| 2019/0138325 A1 | 5/2019 | Chen |
| 2019/0188012 A1* | 6/2019 | Chen .................. G06F 9/451 |
| 2019/0278336 A1 | 9/2019 | Choi et al. |
| 2020/0275564 A1* | 8/2020 | Yu .................. H01L 25/167 |
| 2020/0342338 A1 | 10/2020 | Huang |
| 2021/0149689 A1 | 5/2021 | Jung et al. |
| 2021/0311526 A1 | 10/2021 | Choi et al. |
| 2022/0129041 A1 | 4/2022 | Kim et al. |
| 2022/0130316 A1 | 4/2022 | Skurniak |
| 2022/0210264 A1 | 6/2022 | Jung et al. |
| 2022/0382331 A1 | 12/2022 | Choi et al. |

FOREIGN PATENT DOCUMENTS

| | | |
|---|---|---|
| CN | 111801646 A | 10/2020 |
| EP | 2466458 A1 | 6/2012 |
| JP | 2011-205576 A | 10/2011 |
| JP | 2014-182751 A | 9/2014 |
| KR | 10-2014-0074141 A | 6/2014 |
| KR | 10-1568620 B1 | 11/2015 |
| KR | 10-2016-0071897 A | 6/2016 |
| KR | 10-2018-0027467 A | 3/2018 |
| KR | 10-2020-0091522 A | 7/2020 |
| KR | 10-2021-0027921 A | 3/2021 |
| KR | 10-2021-0037320 A | 4/2021 |
| KR | 10-2021-0060213 A | 5/2021 |
| KR | 10-2021-0132491 A | 11/2021 |

OTHER PUBLICATIONS

International Search Report (PCT/ISA/210) issued Feb. 16, 2022 by the International Searching Authority in International Patent Application No. PCT/KR2021/015038.

Written Opinion (PCT/ISA/237) issued Feb. 16, 2022 by the International Searching Authority in International Patent Application No. PCT/KR2021/015038.

Communication issued on Jul. 15, 2024 by the Chinese National Intellectual Property Administration in Chinese Patent Application No. 202180076530.2.

Communication issued Aug. 9, 2024 by the Korean Intellectual Property Office in Korean Patent Application No. 10-2020-0150981.

Communication dated Dec. 6, 2024 issued by the China National Intellectual Property Administration in Chinese Patent Application No. 202180076530.2.

Communication issued on Mar. 14, 2025 by the China National Intellectual Property Administration in Chinese Patent Application No. 202180076530.2.

Communication dated Aug. 5, 2025 issued by Intellectual Property India for the Indian Patent Application No. 202317032776.

* cited by examiner

ELECTRONIC DEVICE AND APPLICATION EXECUTION METHOD FOR ELECTRONIC DEVICE

CROSS-REFERENCE TO RELATED APPLICATIONS

This application is a by-pass continuation application of International Application No. PCT/KR2021/015038, filed on Oct. 25, 2021, which claims priority to Korean Patent Application No. 10-2020-0150981, filed on Nov. 12, 2020 in the Korean Intellectual Property Office, the disclosures of each of which are incorporated by reference herein in their entirety.

BACKGROUND

1. Field

Embodiments disclosed in the disclosure relate to an electronic device and an application launching method of the electronic device.

2. Description of the Related Art

Generally, when an electronic device first launches an application, a loading process in which a processor of the electronic device (e.g., a central processing unit (CPU)) transmits data resulting in a request for I/O (input/output) from an auxiliary memory device such as a hard disk drive (HDD) to a main memory device such as a random access memory (RAM) until a launch screen is displayed.

Recently, electronic devices including multiple displays, or a flexible display including a plurality of areas, have become increasingly popular. In an electronic device including a single display, the launch screen of the application is always displayed in the same form of the display when the application is launched, such that there is no need to consider a drawing form of the launch screen and a resource used to launch the application. However, in the electronic device including the multiple displays or the flexible display, it is necessary to consider the drawing form of the launch screen and the resource of the application in consideration of a form of the display when launching the application. Furthermore, a method is needed to reduce latency in the application launching in the electronic device including the multiple display or the flexible display.

SUMMARY

Various embodiments of the disclosure are intended to provide an electronic device and an application launching method of the electronic device in which a time consumed to launch an application can be reduced.

Various embodiments of the disclosure are intended to provide an electronic device and an application launching method of the electronic device in which an application to be launched may be predicted, a resource of the predicted application may be pre-loaded to generate a launch screen of the corresponding application in a virtual window.

According to one or more embodiments, an electronic device comprises: a first display; a second display; a memory; and a processor operatively connected to the first display, the second display, and the memory, wherein the memory includes instructions, which upon execution by the processor, cause the processor to: launch a first application, display a launch screen of the first application on the first display, determine a second application expected to be launched on at least one of the first display or the second display based on at least one of a state of the electronic device, a usage history of the electronic device, or information related to the first application, based on a determination a specified trigger condition is satisfied, perform a pre-loading process of one or more resources that are less than a plurality of resources required for launching the second application, generate, based on the pre-loaded one or more resources, a launch screen of the second application in a virtual window corresponding to at least one of the first display or the second display, and based on a determination a screen switch event occurs with respect to the launch screen of the first application, display the launch screen of the second application generated in the virtual window on at least one display corresponding to the screen switch event among the first display and the second display, thereby completing launching of the second application.

Upon execution of the instructions by the processor, the instructions cause the processor to perform the pre-loading process in a background such that pre-loading of the one or more resources is not visible while the launch screen of the first application is displayed.

The usage history of the electronic device includes at least one of a usage time, a place of use, a frequency of uses, a usage pattern of the electronic device, or a usage history of an application stored in the electronic device for a set temporal period.

The state of the electronic device includes at least one of a display state, a communication connection state, an application launching state, a GPS connection state, or a mode setting state of the electronic device.

Upon execution of the instructions by the processor, the instructions cause the processor to set, based on an attribute of the second application, a storage space of the memory to store therein the pre-loaded one or more resources.

Upon execution of the instructions by the processor, the instructions cause the processor to control, based on a battery condition, performance of a processor in charge of performing the pre-loading process, wherein the batter condition is based on at least one of a residual quantity of a battery of the electronic device or whether or not the battery is being charged.

Upon execution of the instructions by the processor, the instructions cause the processor to determine, based on a user setting, whether to provide information about the second application to a user interface providing information about an application being launched.

Upon execution of the instructions by the processor, the instructions cause the processor to determine, based on a user setting, whether to provide a notification related to the second application or to limit a function of the second application.

The trigger condition includes at least one of an on/off condition of the first display or the second display, a low-power mode operation condition of the electronic device, a communication activated condition of the electronic device, a condition related to launching of the first application, or a GPS function activated condition of the electronic device.

The first display and the second display constitute a single flexible display.

According to one or more embodiments, a method for launching an application in the electronic device, the method comprising: launching a first application; displaying a launch screen of the first application on a first display of the electronic device; determining a second application expected to be launched on at least one of the first display or a second display of the electronic device, based on at least one of a state of the electronic device, a usage history of the electronic device, or information related to the first application; based on determining a specified trigger condition is satisfied, performing a pre-loading process of one or more resources that are less than a plurality of resources required for launching the second application; generating, based on the pre-loaded one or more resources, a launch screen of the second application in a virtual window corresponding to at least one of the first display or the second display; and based on determining a screen switch event occurs with respect to the launch screen of the first application, displaying the launch screen of the second application generated in the virtual window on at least one display corresponding to the screen switch event among the first display and the second display, thereby completing launching of the second application.

The pre-loading process is performed in a background such that pre-loading of the one or more resources is not visible while the launch screen of the first application is displayed.

The usage history of the electronic device includes at least one of a usage time, a place of use, a frequency of uses, a usage pattern of the electronic device, or a usage history of an application stored in the electronic device for a set temporal period.

The state of the electronic device includes at least one of a display state, a communication connection state, an application launching state, a GPS connection state, or a mode setting state of the electronic device.

The method comprises setting, based on an attribute of the second application, a storage space of a memory to store therein the pre-loaded resource.

The method comprises controlling, based on a battery condition, performance of a processor in charge of performing the pre-loading process, wherein the battery condition is based on at least one of a residual quantity of a battery of the electronic device or whether or not the battery is being charged.

The method comprises determining, based on a user setting, whether to provide information about the second application to a user interface providing information about an application being launched.

The method comprises determining, based on a user setting, whether to provide a notification related to the second application or to limit a function of the second application.

The trigger condition includes at least one of an on/off condition of the first display or the second display, a low-power mode operation condition of the electronic device, a communication activated condition of the electronic device, a condition related to launching of the first application, or a GPS function activated condition of the electronic device.

According to one or more embodiments, a non-transitory computer recording medium storing therein computer-readable instructions, which upon execution by a processor in an electronic device cause the processor to: launch a first application; display a launch screen of the first application on a first display of the electronic device; determine a second application expected to be launched on at least one of the first display or a second display of the electronic device, based on at least one of a state of the electronic device, a usage history of the electronic device, or information related to the first application; based on a determination a specified trigger condition is satisfied, perform a pre-loading process of one or more resources that are less than a plurality of resources required for launching the second application; generate, based on the pre-loaded one or more resources, a launch screen of the second application in a virtual window corresponding to at least one of the first display or the second display, based on the pre-loaded resource; and based on a determination a screen switch event occurs with respect to the launch screen of the first application, display the launch screen of the second application generated in the virtual window on at least one display corresponding to the screen switch event among the first display and the second display, thereby completing launching of the second application.

In addition to the above effects, various effects identified directly or indirectly through the disclosure may be provided.

BRIEF DESCRIPTION OF DRAWINGS

With respect to the description of the drawings, the same or similar reference numerals may be used for the same or similar elements.

DETAILED DESCRIPTION

Figure 1:
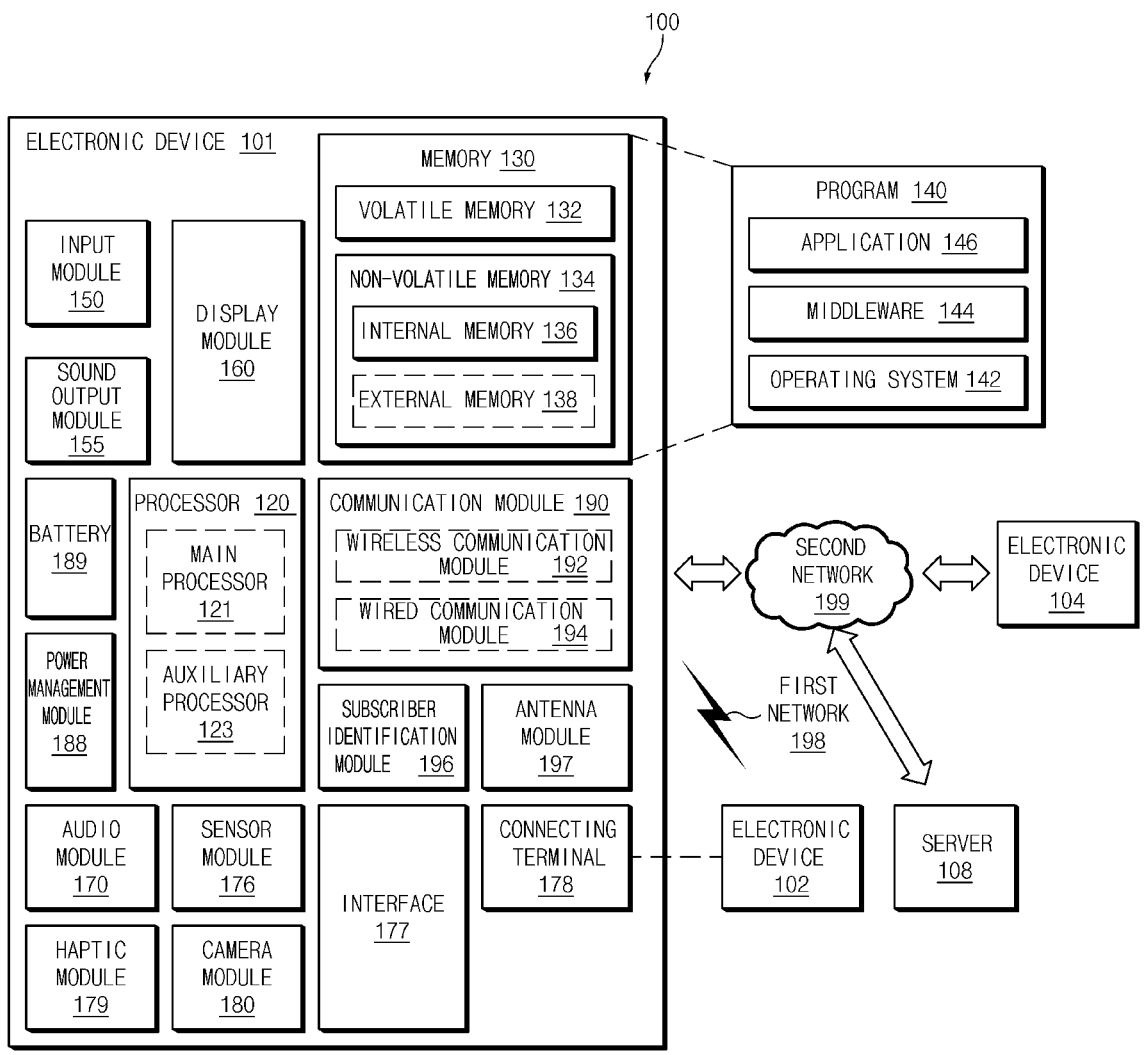
FIG. 1 is a block diagram illustrating an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to one or more embodiments, the electronic device 101 may communicate with the electronic device 104 via the server 108. According to one or more embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one or more embodiments, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to one or more embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one or more embodiments, the auxiliary processor 123 (e.g., an image signal processor or a communication processor) may be implemented as part of another component (e.g., the camera module 180 or the communication module 190) functionally related to the auxiliary processor 123. According to one or more embodiments, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to one or more embodiments, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to one or more embodiments, the display module 160 may include a touch sensor adapted to detect a touch, or a pressure sensor adapted to measure the intensity of force incurred by the touch.

The audio module 170 may convert a sound into an electrical signal and vice versa. According to one or more embodiments, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to one or more embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one or more embodiments, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image or moving images. According to one or more embodiments, the camera module 180 may include one or more lenses, image sensors, image signal processors, or flashes.

The power management module 188 may manage power supplied to the electronic device 101. According to one or more embodiments, the power management module 188 may be implemented as at least part of, for example, a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to one or more embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one or more embodiments, the antenna module 197 may include an antenna including a radiating element composed of a conductive material or a conductive pattern formed in or on a substrate (e.g., a printed circuit board (PCB)). According to one or more embodiments, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to one or more embodiments, another component (e.g., a radio frequency integrated circuit (RFIC)) other than the radiating element may be additionally formed as part of the antenna module 197.

According to various embodiments, the antenna module 197 may form a mmWave antenna module. According to one or more embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to one or more embodiments, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to one or more embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
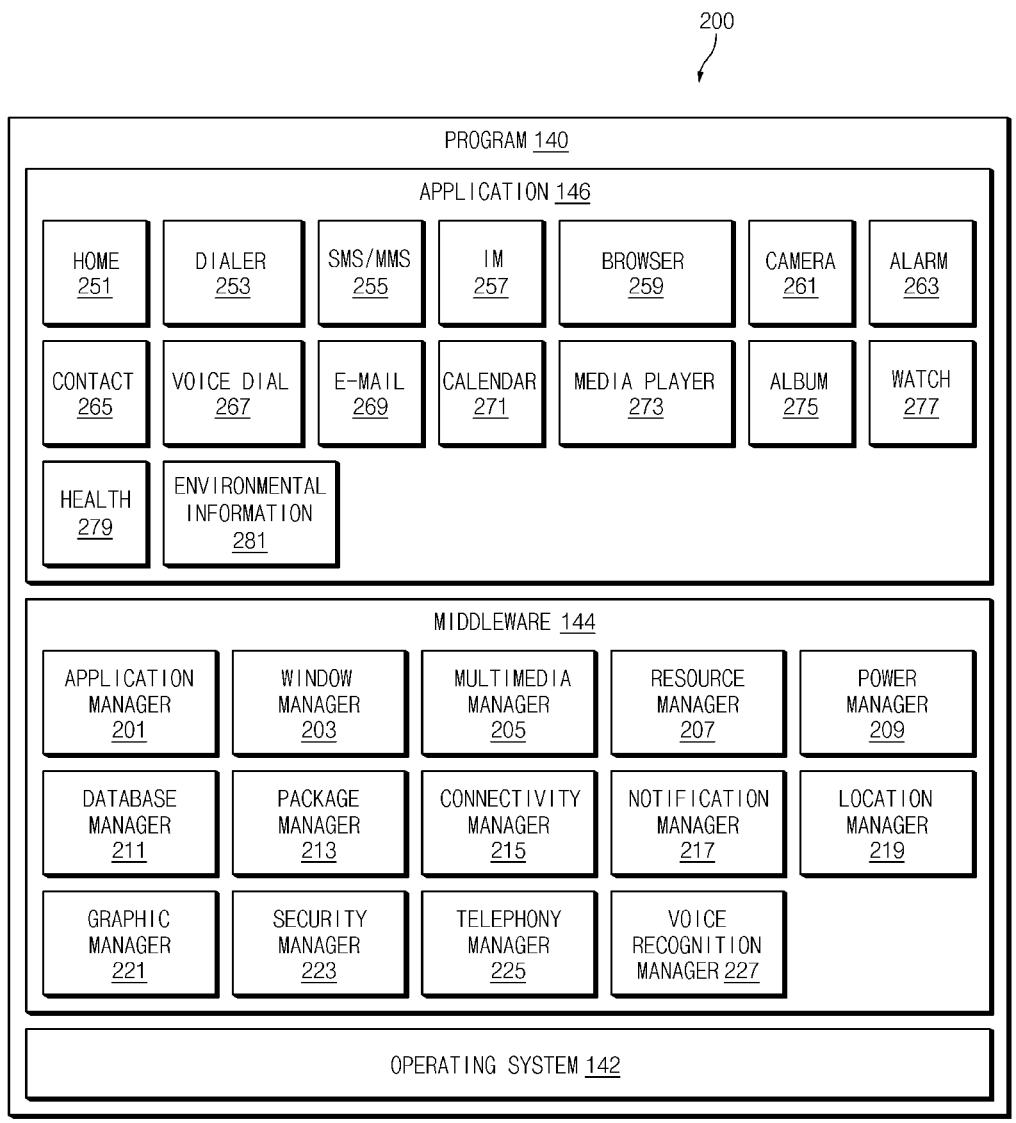
FIG. 2 is a block diagram illustrating the program, according to various embodiments.

FIG. 2 is a block diagram 200 illustrating the program 140 according to various embodiments. According to one or more embodiments, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to one or more embodiments, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to one or more embodiments, the middleware 244 may dynamically delete some existing components or add new components. According to one or more embodiments, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to one or more embodiments, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
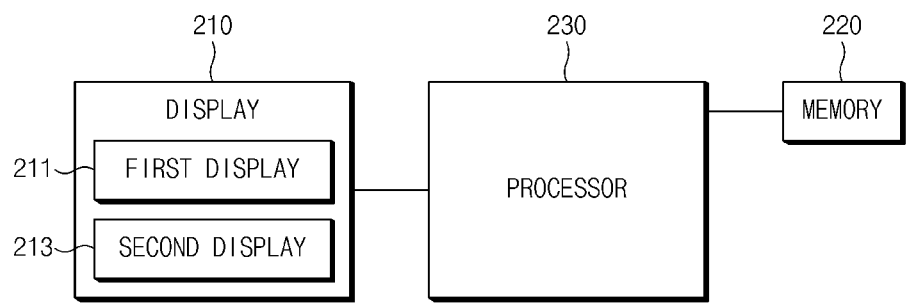
FIG. 3 is a block diagram of an electronic device, according to one or more embodiments.

FIG. 3 is a block diagram of an electronic device according to one or more embodiments.

According to one or more embodiments, the electronic device may include a display, a processor, and a memory.

According to one or more embodiments, the display may include a first display and a second display. According to one or more embodiments, the display may visually provide content or any other suitable information. According to one or more embodiments, the first display and the second display may constitute one flexible display. For example, the flexible display may include at least one of a foldable display, a slidable display, and a rollable display. In one or more examples, the foldable display may include the first display and the second display distinguishable from each other based on a foldable portion. In one more examples, the slidable (or rollable) display may include the first display of a reduced state and the second display of an expanded state. For example, at least a portion of the slidable (or rollable) display may be inserted into a housing of an electronic device or may be exposed out of the housing. For example, when the at least a portion of the slidable (or rollable) display is received in the housing, the inserted portion may be hidden by the housing when viewed from an outside out of the electronic device. In one or more examples, in a state where the at least a portion of the slidable (or rollable) display is inserted (received) into the housing, the first display and the second display of the slidable (or rollable) display may be distinguished from each other depending on an area size of the portion inserted into the housing. For example, the portion of the slidable (or rollable) display hidden by the housing may be defined as the first display, while a portion thereof not hidden by the housing, but exposed to the outside, may be defined as the second display.

According to one or more embodiments, the memory may store therein instructions for controlling an operation of the electronic device when the instructions are executed by the processor. According to one or more embodiments, the memory may include at least one application (e.g., the application 146 of FIG. 1 and/or FIG. 2).

According to one or more embodiments, the processor may launch a first application. For example, the processor may launch the first application selected based on user input. In one or more examples, the processor may perform a launching process for the first application. For example, the processor may load a resource necessary for launching the first application and launch the first application based on the loaded resources necessary for launching the first application. According to one or more embodiments, the processor may display a launch screen of the first application on the first display. In one or more examples, a resource necessary to launch an application may include, but not limited to, source code, one or more graphical objects to be displayed, information regarding a UI wireframe, etc.

According to one or more embodiments, based on at least one of a state of the electronic device, a usage history of the electronic device, and information related to the first application, the processor may determine a second application expected to be launched on at least one of the first display and the second display. For example, the processor may determine a likelihood of a second application launching after the first application is launched, or simultaneously with the launching of the first application.

According to one or more embodiments, the state of the electronic device may launching state, a GPS connection state, and a mode setting state of the electronic device. For example, the display state may include an on/off state of each of the displays included in the electronic device. For example, the state of the display may include a form (e.g., a form factor) of the flexible display. In one or more examples, the mode setting state may include whether or not the electronic device is in a power saving mode and/or whether or not it is in a locked state.

According to one or more embodiments, the usage history of the electronic device may include at least one of a usage time, a place of use, a frequency of uses, a usage pattern, and a usage history of an application stored in the electronic device for a set period of time. For example, the usage history of the application may include a usage history of applications used in connection with each other and/or a usage history of an application used in a specific display or a state thereof.

For example, the information related to the first application may include a type of the first application, a usage history of the first application, an application related to the first application, a current state of the first application, and/or a function being used by the first application.

In one or more examples, the processor may determine, as a second application, an application (e.g., an application that has been frequently launched after the first application has been launched) which is likely to be used after an application (e.g., the first application) is being launched. For example, the processor may determine, as the second application, an application which has been frequently used when a specific display switches from an off state to an on state. In one or more examples, when the display is in an off state, the processor may determine an application that has been launched prior to the off state as the second application.

According to one or more embodiments, the processor may determine the second application based on each of the displays included in the electronic device. For example, the processor may determine the second application expected to be launched on the first display, the second application expected to be launched on the second display, and/or the second application expected to be launched on both of the first display and the second display. In one or more examples, the processor may determine the second application to be launched on the first display based on the first application launched on the second display. In one or more examples, the processor may determine the second application to be launched on the second display based on the first application launched on the first display. In one or more examples, the processor may determine the second application expected to be launched on the second display independent of the first display currently being used (e.g., independent of the first display currently being used), and/or the second application expected to be launched on both of the first display and the second display.

According to one or more embodiments, when a specified trigger condition is satisfied, the processor may perform a pre-loading process of at least a partial resource required for launching the second application. According to one or more embodiments, the trigger condition may include at least one of an on/off condition of the first display or the second display, a low-power mode operation condition of the electronic device, a communication activated condition of the electronic device, a condition related to the launching of the first application, and a GPS function activated condition of the electronic device. A communication activated condition may correspond to an activation of a Wi-Fi connection or a Bluetooth connection. A GPS function activated condition may correspond to an activation of a GPS connection between the electronic device and GPS network equipment such as a satellite.

For example, the processor may perform the pre-loading process of the second application when at least one of following events occurs: an event in which the first display and/or the second display switches from the off state to the on state or from the on state to the state, an event in which the electronic device operates in the low-power mode, an event in which a specified function is being performed in the first application after a specified time has elapsed after the first application is launched, an event in which communication (e.g., Wi-Fi) of the electronic device is activated, or an event in which a GPS function of the electronic device is activated.

According to one or more embodiments, the pre-loading process may be an operation of pre-performing one or more launching processes from a plurality of launching processes related to an application. For example, the pre-loading process may be an operation of pre-loading a resource necessary for launching the application into a designated space of a memory. In one or more examples, launching of a pre-loaded application may be completed more rapidly than launching of a non-pre-loaded application.

According to one or more embodiments, the processor may determine an attribute of the second application. For example, the processor may determine whether the second application uses a relatively large amount of a memory or a relatively small amount of the memory. According to one or more embodiments, the processor may set a storage space (e.g., a memory slot) of the memory to store therein the pre-loaded resource of the second application based on the attribute of the second application. For example, the processor may limit a memory amount allocated to the second application based on the attribute of the second application. For example, when the second application uses a relatively large amount of the memory, the processor may limit the memory amount allocated to the second application (e.g., the processor may store the pre-loaded resource of the second application in the set storage space of the memory).

According to one or more embodiments, the processor may determine whether a residual quantity of a battery is greater than or equal to a preset value, or whether the battery is being charged. According to one or more embodiments, the processor may set a performance of the processor to a high performance when the residual quantity of the battery is equal to or greater than the preset value or when the battery is being charged. In this regard, the processor speed may be set to a level that is proportional to the available battery charge. For example, the processor may set a resource (e.g., a CPU resource) of the processor to a relatively high level when the battery is being charged or when the residual quantity of the batter is greater than or equal to a preset value. For example, the processor may set a processing speed (e.g., a CPU clock) of the processor to a relatively high level when the battery is being charged or when the residual quantity of the batter is greater than or equal to a preset value. In one or more examples, the processor may assign at least one thread related to the predicted application to a high-performance core of the processor when the battery is being charged or when the residual quantity of the batter is greater than or equal to a preset value. In one or more examples, the processor may include a high-performance core having a relatively high-processing speed and a low-performance core having a relatively low-processing speed. The low-performance core may include a low-power core that consumes relatively smaller power. Thus, when the battery is being charged or when the residual quantity of the batter is greater than or equal to a preset value, the high-performance core may be used.

According to one or more embodiments, the processor may set the performance of the processor to a low performance level when the residual quantity of the battery is smaller than the preset value and the battery is not being charged. For example, the processor may set the processor's resource (e.g., the CPU resource) to a relatively low level having a lower processor speed. For example, the processor may set the processor's processing speed (e.g., the CPU clock) to a relatively low level when the residual quantity of the battery is smaller than the preset value and the battery is not being charged. In one or more examples, the processor may assign at least one thread related to the predicted application to the low-performance core (e.g., a low-power core) of the processor. According to one or more embodiments, the processor may perform the pre-loading process of the application based on the set performance of the processor.

According to one or more embodiments, the processor may not perform the pre-loading process of the second application when the determined second application is already launched in the electronic device (e.g., when the second application is being already launched in a background). For example, a resource related to an application that is already launched has already been loaded in the memory (e.g., a cache). In this case, the processor does not need to perform the pre-loading process to redundantly load the resource that was previously loaded. Thus, in this case the processor may not perform the pre-loading process on the second application even when the processor detects the trigger condition.

According to one or more embodiments, based on the pre-loaded resource, the processor may generate a launch screen of the second application in a virtual window corresponding to at least one of the first display and the second display. According to one or more embodiments, the processor may generate the virtual window corresponding to at least one of the first display and the second display on which the second application is expected to be launched (e.g., expected to display the launch screen of the second application thereon). For example, the processor may generate the launch screen of the second application in the generated virtual window based on the pre-loaded resource. In one or more examples, when the processor determines the second application based on each of displays included in the electronic device, the processor may generate a virtual window corresponding to each display, and may generate the launch screen of the determined second application in the corresponding virtual window. For example, the processor may generate the launch screen of the second application expected to be launched on the first display in the virtual window corresponding to the first display, or may generate the launch screen of the second application expected to be launched on the second display in the virtual window corresponding to the second display. In one or more examples, the processor may generate the launch screen of the second application expected to be launched on both of the first display and the second display in the virtual window corresponding to both of the first display and the second display.

According to one or more embodiments, the pre-loading process and the operation of generating the launch screen of the second application in the virtual window may be referred to as a pre-launching process of pre-launching the second application. For example, using the virtual window, the processor may pre-launch the second application expected to be launched.

According to one or more embodiments, the processor may determine whether to provide information of the second application on a user interface that provides information of an application being launched based on a user setting. For example, the processor may provide the user interface that provides information on the application being currently launched based on the user input. In one or more examples, the user interface may include information about a recently launched application (e.g., recent app). According to one or more embodiments, the processor may determine whether to display the pre-loaded second application (or the pre-launched second application) as an application being launched on the user interface, based on the user setting.

According to one or more embodiments, the processor may determine whether a notification related to the second application is provided or whether a function of the second application is limited, based on the user setting. For example, because the pre-loaded (or pre-launched) second application may not be an application launched due to the user's direct selection thereof, the processor may determine whether to provide the notification related to the pre-loaded (or pre-launched) second application to the user, based on the user setting. Furthermore, the processor may determine whether the pre-loaded (or pre-launched) second application is allowed to use a specific function (e.g., a communication function (e.g., whether the second application is allowed to use communication data)), based on the user setting.

According to one or more embodiments, when a screen switch event occurs, the processor may display the launch screen of the second application generated in the virtual window on at least one display corresponding to the screen switch event among the first display and the second display and thus, may complete the launching of the second application. According to one or more embodiments, the screen switch event may include an event (e.g., user input) for switching a display (or an area of the display) to be used while the launch screen of the first application is displayed on the first display. For example, the screen switch event may include at least one of an event for using the second display while using the first display, an event for using both of the first display and the second display while using the first display, or an event for launching another application on the first display.

According to one or more embodiments, the processor may determine whether the screen switch event is related to the second application. For example, when the screen switch event is related to the second application, the processor may display the launch screen of the second application on a corresponding display to complete the launching of the second application. When the screen switch event is not related to the second application, the processor may launch another application corresponding to the screen switch event.

According to one or more embodiments, when detecting the screen switch event, the processor may perform a remaining process (e.g., a process excluding the pre-loading process and the process of generating the launch screen in the virtual window) for launching the second application. According to one or more embodiments, the processor may display the launch screen of the second application generated in the virtual window on at least one display corresponding to the screen switch event.

Figure 4:
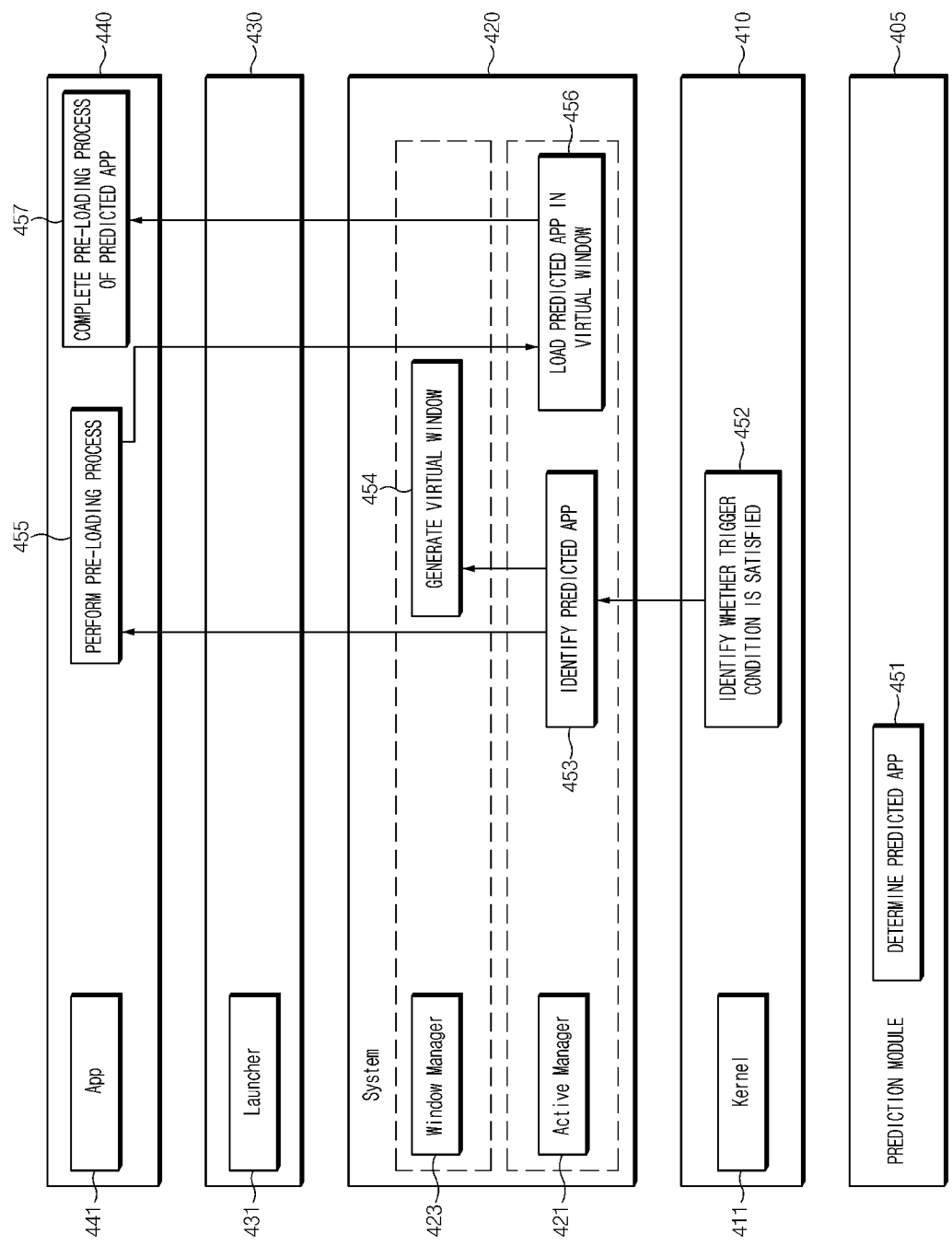
FIG. 4 is a diagram showing a pre-loading process of an application, according to one or more embodiments, in which the pre-loading process is composed of operations executed by components constituting the electronic device.

FIG. 4 is a diagram showing a pre-loading process of an application, according to one or more embodiments, in which the pre-loading process is composed of operations executed by components constituting the electronic device.

Referring to FIG. 4, an electronic device (e.g., the electronic device 101 in FIG. 1 or the electronic device 300 in FIG. 3) may pre-load the application based on the pre-loading process performed by five components including, but not limited to, a prediction module 405, a kernel 411, a system 420, a launcher 431, and/or an application (App) 441. In one or more examples, the prediction module 405 may be a processor of the electronic device (e.g., the processor 120 of FIG. 1 or the processor 330 of FIG. 3). In one or more examples, the pre-loading process may be a process of preferentially executing at least a portion of a loading process for launching a specific application. FIG. 4 shows a process in which the pre-loading process is performed under control of the five components (e.g., the prediction module 405, the kernel 411, the system 420, the launcher 431, and/or the application 441). However, the disclosure is not limited thereto.

According to one or more embodiments, in operation 451, the prediction module 405 (e.g., the processor 120 of FIG. 1 or the processor 330 of FIG. 3) may determine an application (e.g., a predicted application (predicted App)) to be launched next, based on at least one of the state of the electronic device, the usage history of the electronic device, and information related to the application being launched. According to one or more embodiments, the prediction module 405 may determine the predicted application based on each of displays (e.g., the display module 160 of FIG. 1 or the display 310 of FIG. 3) included in the electronic device. For example, when the electronic device includes the first display and the second display, the prediction module 405 may determine the predicted application expected to be launched based on each of the first display and/or the second display.

According to one or more embodiments, in operation 452, the kernel 411 may identify whether the trigger condition corresponding to the predicted application is satisfied. For example, the trigger condition may include a launch condition of the pre-loading process on the predicted app. According to one or more embodiments, the trigger condition may include at least one of an on/off condition of at least one display, a low-power mode operation condition of the electronic device, a communication activated condition of the electronic device, a condition related to launching of an application, and a GPS function activated condition of the electronic device. According to one or more embodiments, the trigger condition may include the launch condition of the pre-loading process on the predicted application based on a set time. For example, the trigger condition is met if the launch condition occurs at the set time.

According to one or more embodiments, in operation 453, an active manager 421 included in the system 420 may identify the predicted application. According to one or more embodiments, the system 420 may perform at least a portion of the pre-loading process using the active manager 421 and a window manager 423. For example, the active manager 421 may activate at least one application or perform a partial operation of the at least one application according to a launching process. In one or more examples, the active manager 421 may manage the launching process of the at least one application. In one or more examples, the window manager 423 may manage a window displayed on a display of the electronic device.

According to one or more embodiments, in operation 454, the window manager 423 may generate the virtual window that is not displayed on the display. For example, the window manager 423 may generate the virtual window in relation to an application (e.g., the predicted application identified by the active manager 421) launched in the background, and may perform a (pre) loading process of the application in the background such that application is not displayed on the display of the electronic device. The loading or pre-loading of a resource in a background may correspond to a process in which the loading or pre-loading of the resource is not visible to a user.

In one or more examples, the window manager 423 may at least partially launch the at least one application based on the generated virtual window. According to one or more embodiments, the window manager 423 may manage the window displayed on the display and the virtual window that is not displayed on the display (e.g., launching of application in the background).

According to one or more embodiments, the application (App) 441 may include at least one application. According to one or more embodiments, in operation 455, a pre-loading process of the at least one application may be performed under control of the system 420.

According to one or more embodiments, in operation 456, the active manager 421 of the system 420 may load the predicted application identified in operation 453 to the virtual window. For example, the active manager 421 may generate the launch screen of the predicted application in the virtual window. According to one or more embodiments, the active manager 421 may load the predicted application based on the virtual window that is not displayed on the screen (e.g., launching of application in the background).

According to one or more embodiments, in operation 457, the application 441 may complete the pre-loading process of the predicted application. For example, the pre-loading process may include at least a portion of the launching process of the predicted application. For example, the pre-loading process may include at least a portion of the pre-launching process of the application or may refer to the pre-launching process of the application. The pre-loading of at least a portion of the launching process of the predicted application may include pre-loading one or more resources that are less than a plurality of resources required to launch the predicted application. According to one or more embodiments, the electronic device (e.g., the processor) may complete the pre-loading process on the predicted application. When the screen switch event is detected, the processor may provide the predicted application to the user at a high speed (e.g., speed of providing application is improved). According to one or more embodiments, when the pre-loading process of the launching process related to the predicted application is performed, the electronic device may provide the predicted application to the user at a higher speed. In one or more examples, when the electronic device detects the screen switch event, the electronic device may display the launch screen of the predicted application pre-generated in the virtual window on at least one display corresponding to the screen switch event such that the launching of the predicted application may be completed quickly.

Figure 5:
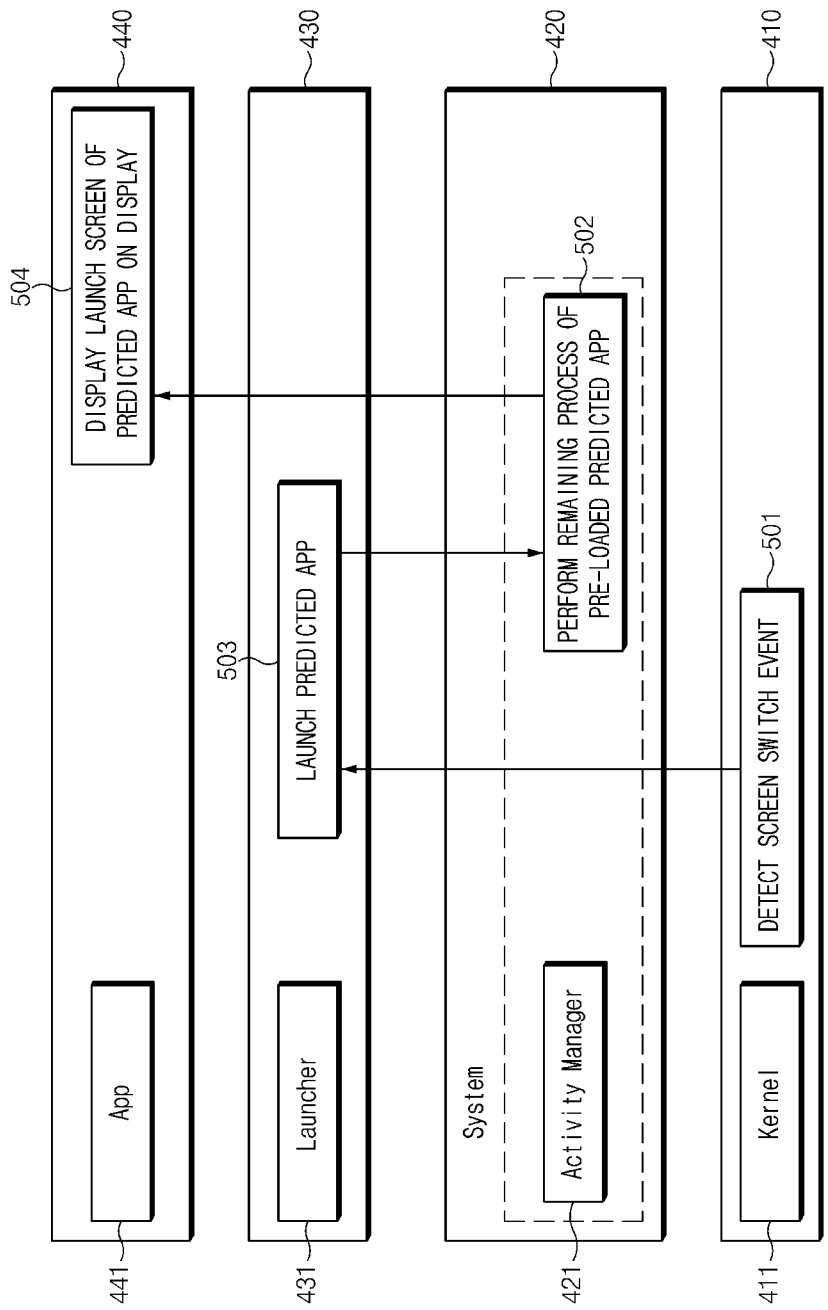
FIG. 5 is a diagram showing a process of activating a predicted application among applications, and displaying the activated predicted application on a display, according to one or more embodiments, where the process is composed of operations executed by components constituting the electronic device.

FIG. 5 is a diagram showing a process of activating a predicted application from a plurality of applications, and displaying the activated predicted application on a display according to one or more embodiments, where the process is composed of operations executed by components constituting the electronic device.

Referring to FIG. 5, the electronic device (e.g., the electronic device 101 in FIG. 1 or the electronic device 300 in FIG. 3) may display the pre-loaded predicted application on the display (e.g., the display module 160 in FIG. 1 or the display 310 in FIG. 3), using four components including, but not limited to, the kernel 411, the system 420, the launcher 431 and/or the application (App) 441. FIG. 5 shows a process of displaying the pre-loaded predicted application on the display under control of the four components (e.g., the kernel 411, the system 420, the launcher 431, and/or the application 441). The disclosure is not limited this configuration, and may be modified to include any other modules as understood by one of ordinary skill in the art.

Referring to FIG. 5, the process of displaying the pre-loaded predicted application may start from a state in which the electronic device has already determined the predicted application (prediction App) based on at least one of the state of the electronic device, the usage history of the electronic device, and the information related to the application, and the state in which the electronic device has already performed the pre-loading process on the determined predicted application. For example, the process of displaying the pre-loaded predicted application may start from a state in which the electronic device has already determined the predicted application based on each of displays (e.g., the display module 160 in FIG. 1 or the display 310 in FIG. 3) included in the electronic device, and has already performed the pre-loading process on each predicted application.

According to one or more embodiments, in operation 501, the kernel 411 may detect the screen switch event. For example, the screen switch event may include an event for changing a display in use and/or an area of the display in use. For example, when the electronic device includes a plurality of displays, the screen switch event may be an event of changing at least a portion of a display to be used among the plurality of displays. In one or more examples, the screen switch event may include an event in which a display being used in the electronic device is changed from the first display to the second display, or an event in which the display being used in the electronic device is changed to the first display and the second display. In one or more examples, when the electronic device includes a flexible display, the screen switch event may include an event in which an area of a display to be used in the flexible display is changed according to change in the form factor of the electronic device. The form factor may corresponding to the configuration of the flexible display, such as, folding/unfolding of a foldable display, or expansion or contraction of a slidable (or rollable) display). In one or more examples, the screen switch event may include switching a display from one area of a display to another area of the display. According to one or more embodiments, the electronic device may detect a user's input for changing the display (or the area of the display) to be used using the kernel 411, and thus, may detect that the screen switch event has occurred.

According to one or more embodiments, in operation 502, the launcher 431 may perform the launching of the predicted application. For example, in response to the occurrence of the screen switch event, the launcher 431 may perform the launching of the predicted application so that the launch screen of the predicted application is displayed on the display corresponding to the screen switch event.

According to one or more embodiments, in operation 503, the active manager 421 included in the system 420 may perform a remaining process on the pre-loaded predicted application. For example, when the electronic device (e.g., the activity manager 421) launches a specific application, the electronic device may perform an entirety of at least one launching process on the specific application. According to one or more embodiments, when the pre-loading process (or pre-launching process) on the predicted app has already been performed, the processor 120 may perform the remaining process of the entirety of the launching process other than the pre-loading process. According to one or more embodiments, when the pre-loading process on the predicted application has already been performed, the remaining process may be performed to complete the entirety of the launching process.

According to one or more embodiments, in operation 504, the application 441 may display the launch screen of the predicted application on the display corresponding to the screen switch event. According to one or more embodiments, when the predicted application has already been in the pre-loaded state, the launch screen of the predicted application may be quickly displayed on the display 160. For example, after the pre-loading process (or the pre-launching process), the launch screen of the predicted application has already been generated in the virtual window (virtual window). For example, the electronic device may display the already generated launch screen on the display corresponding to the screen switch event to complete the launching of the predicted application. In one or more examples, the launch screen may include an image of the application in a state in which the launching process on the application has been completed.

Figure 6:
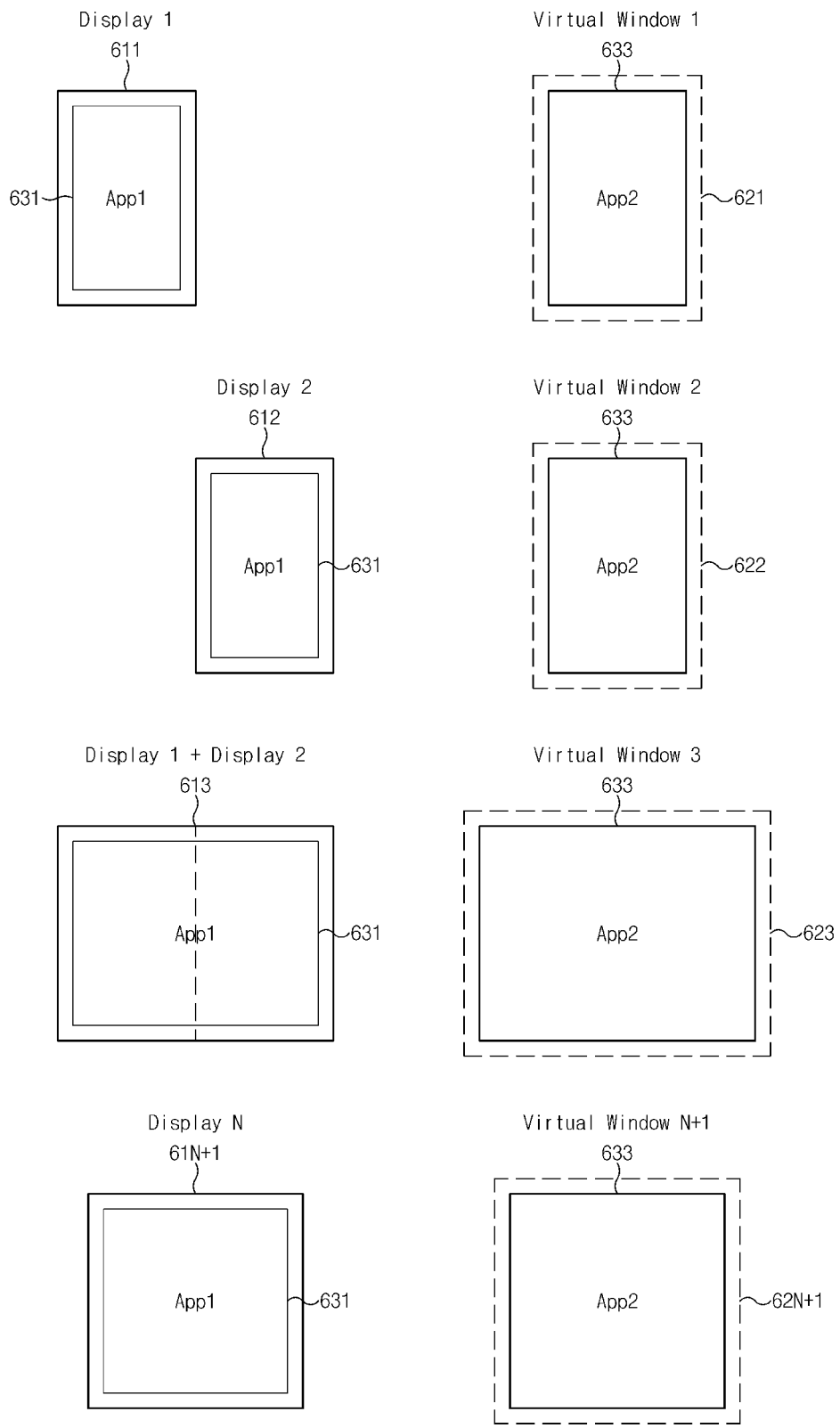
FIG. 6 is a diagram showing a screen displayed on a display and a screen generated via a virtual window, according to various embodiments.

FIG. 6 is a diagram showing a screen displayed on a display and a screen generated via a virtual window, according to various embodiments.

Referring to FIG. 6, the electronic device (e.g., the electronic device 101 in FIG. 1 or the electronic device 300 in FIG. 3) may display a screen on the display (e.g., the display module 160 in FIG. 1 or the display 310 in FIG. 3). For example, the screen may include a launch screen of the first application (App1) 631.

According to one or more embodiments, the electronic device may identify the state of the electronic device, the usage history of the electronic device, and information related to the first application in a state in which the launch screen of the first application 631 is displayed.

According to one or more embodiments, the state of the electronic device may include at least one of a display state of the electronic device, a communication connection state thereof, an application launching state thereof, a GPS connection state thereof, and a mode setting state of the electronic device.

According to one or more embodiments, the usage history of the electronic device may include at least one of the usage time of the electronic device, the place of use thereof, the frequency of uses thereof, the usage pattern thereof, the usage history of the application stored in the electronic device for a set period, or any other suitable usage information known to one of ordinary skill in the art.

According to one or more embodiments, the electronic device may determine a second application 633 to be launched after the launching of the first application 631, based on at least one of the state of the electronic device, the usage history of the electronic device, and the information related to the first application. For example, when the screen switch event occurs, the electronic device may determine the second application 633, which is likely to be launched next after the first application 631 has been launched. According to one or more embodiments, the number of the second applications 633 may be plural, and the number of the second applications 633 may be determined based on a processing capability of the electronic device 101. According to various embodiments, the electronic device may independently determine the second application expected to be launched, or may determine the second application expected to be launched in conjunction with an external electronic device (e.g., a server). In one or more examples, the electronic device may receive information about the second application expected to be launched from the external electronic device. According to one or more embodiments, the electronic device may configure an algorithm (e.g., a machine learning algorithm and/or an artificial intelligence learning model) based on at least one of the state of the electronic device, the usage history of the electronic device, and the information related to the first application. According to one or more embodiments, the electronic device may determine the second application expected to be launched using the configured algorithm. According to one or more embodiments, the algorithm may be updated based on at least one of the state of the electronic device, the usage history of the electronic device, and/or the information related to the first application at a set time.

According to one or more embodiments, the electronic device may determine the second application 633 expected to be launched based on each display included in the electronic device, or each form or area of a display which may be executed in the electronic device. For example, when the electronic device includes a plurality of displays, the second application 633 may be determined based on each of the plurality of displays. For example, when the form of the display of the electronic device may be changed (e.g., the flexible display), the second application 633 may be determined based on each form of the display into which the display is to be deformed. In one or more examples, the electronic device may determine the second application 633 expected to be launched on at least one of other displays, or other forms of the display, other than a currently used display, or a currently used form of the display.

According to one or more embodiments, the electronic device may generate the virtual window for pre-loading, and may perform the pre-loading process on the determined second application 633. For example, the virtual window may be a window that is not displayed on the display. According to one or more embodiments, the electronic device may generate the virtual window for the second application 633, and may generate a launch screen of the second application 633 in the virtual window.

For example, the electronic device may generate the virtual window corresponding to each of displays included in the electronic device or each of forms (e.g., form factors) of a display included in the electronic device. In one or more examples, when the electronic device includes the first display 611 and the second display 612, the electronic device may generate a first virtual window 621 corresponding to the first display and/or a second virtual window 622 corresponding to the second display. For example, when the first display and the second display constitute one flexible display (e.g., a foldable display), the electronic device may generate a third virtual window 623 corresponding to both of the first display and the second display 613. In one or more examples, when the electronic device includes N displays, the electronic device may generate an N-th virtual window corresponding to an N-th display. In one or more examples, the electronic device may generate the launch screen of the second application expected to be launched based on each generated virtual window.

According to one or more embodiments, when the screen switch event is detected, the electronic device may display, on the display, the launch screen of the second application as already generated in the virtual window. For example, the electronic device may generate the virtual window based on each of displays, or a form of a display, and may generate the launch screen of the second application to be launched. Subsequently, when the screen switch event occurs, the electronic device may display the launch screen already generated on a display corresponding to the screen switch event such that the launching of the application may be completed quickly.

An electronic device, according to one or more embodiments, may include a first display, a second display, a memory, and a processor operatively connected to the first display, the second display, and the memory, where the memory may include instructions, where when the instructions are executed by the processor, the instructions may cause the processor to launch a first application, display a launch screen of the first application on the first display, determine a second application expected to be launched on at least one of the first display or the second display, based on at least one of a state of the electronic device, a usage history of the electronic device, or information related to the first application, when a specified trigger condition is satisfied, perform a pre-loading process of at least a partial resource required for launching the second application, generate a launch screen of the second application in a virtual window corresponding to at least one of the first display or the second display, based on the pre-loaded resource, and when a screen switch event occurs, display the launch screen of the second application generated in the virtual window on at least one display corresponding to the screen switch event among the first display and the second display, thereby completing launching of the second application.

According to one or more embodiments, when the instructions are executed by the processor, the instructions may cause the processor to perform the pre-loading process in a background.

According to one or more embodiments, the usage history of the electronic device may include at least one of a usage time, a place of use, a frequency of uses, a usage pattern of the electronic device, or a usage history of an application stored in the electronic device for a set temporal period.

According to one or more embodiments, the state of the electronic device may launching state, a GPS connection state, or a mode setting state of the electronic device.

According to one or more embodiments, when the instructions are executed by the processor, the instructions may cause the processor to set a storage space of the memory to store therein the pre-loaded resource, based on an attribute of the second application.

According to one or more embodiments, when the instructions are executed by the processor, the instructions may cause the processor to control performance of a processor in charge of performing the pre-loading process, based on at least one of a residual quantity of a battery of the electronic device or whether or not the battery is being charged.

According to one or more embodiments, when the instructions are executed by the processor, the instructions may cause the processor to determine whether to provide information about the second application to a user interface providing information about an application being launched, based on a user setting.

According to one or more embodiments, when the instructions are executed by the processor, the instructions may cause the processor to determine whether to provide a notification related to the second application or to limit a function of the second application, based on a user setting.

According to one or more embodiments, the trigger condition may include at least one of an on/off condition of the first display or the second display, a low-power mode operation condition of the electronic device, a communication activated condition of the electronic device, a condition related to launching of the first application, or a GPS function activated condition of the electronic device.

According to one or more embodiments, the first display and the second display may constitute a single flexible display.

Figure 7:
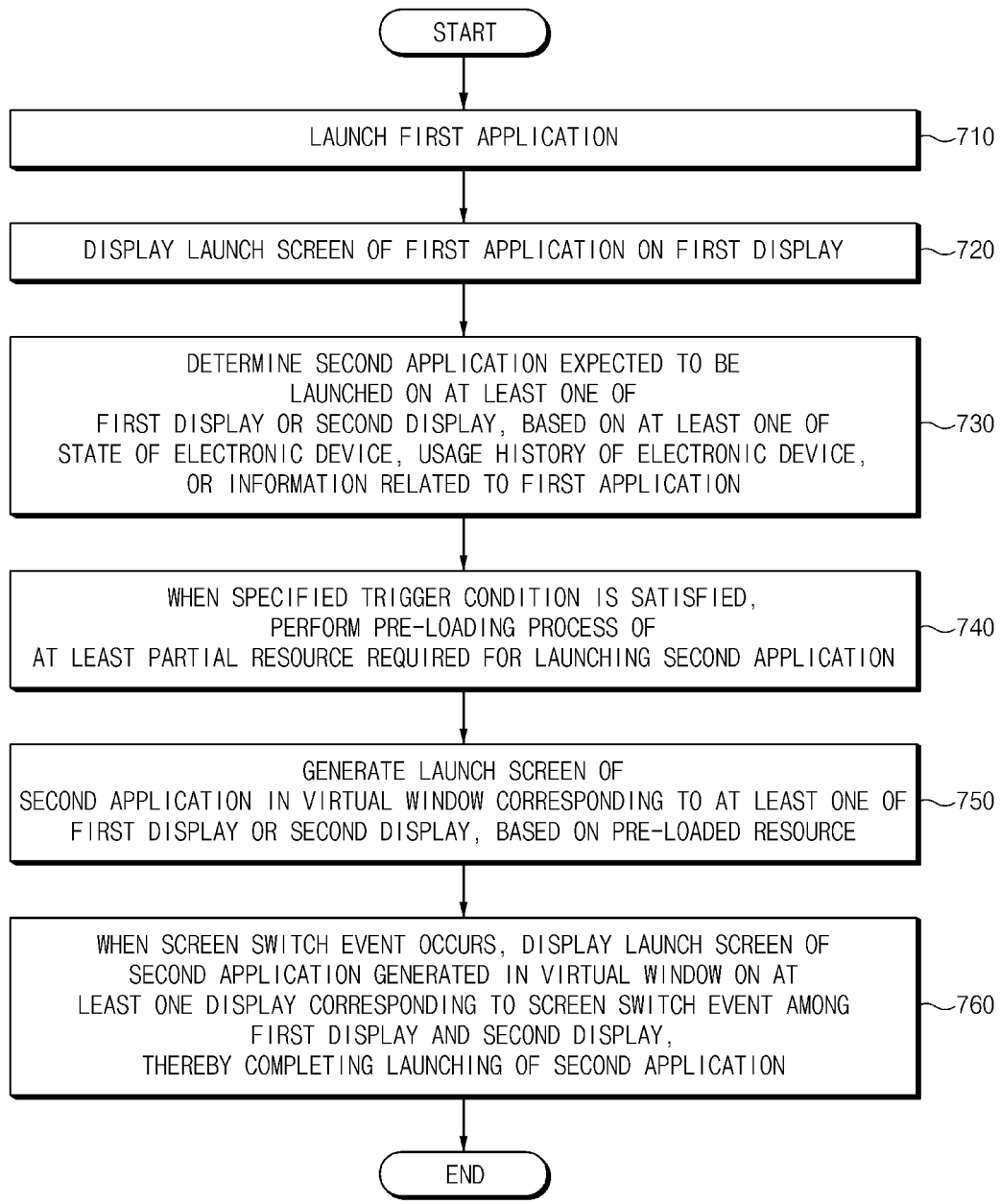
FIG. 7 is a flowchart of an application launching method of an electronic device, according to one or more embodiments.

FIG. 7 is a flowchart of an application launching method of an electronic device (e.g., the electronic device 101 in FIG. 1 or the electronic device 300 in FIG. 3) according to one or more embodiments.

According to one or more embodiments, in operation 710, the electronic device may launch the first application. For example, the electronic device may include at least one application (e.g., the application 146 of FIG. 1 and FIG. 2). In one or more examples, the electronic device may launch the first application selected based on a user input. In one or more examples, the electronic device may perform the launching process of the first application. In one or more examples, the electronic device may load a resource necessary for launching the first application, and launch the first application based on the loaded resource necessary for launching the first application.

According to one or more embodiments, in operation 720, the electronic device may display the launch screen of the first application on the first display. According to one or more embodiments, the electronic device may include at least one display. For example, the electronic device may include the first display and the second display. According to one or more embodiments, the first display and the second display may constitute a single flexible display. For example, the flexible display may include at least one of a foldable display, a slidable display, and a rollable display. For example, the foldable display may include the first display and the second display which are distinguished from each other based on a foldable portion. For example, the slidable (or rollable) display may include the first display of a reduced state and the second display of an expanded state.

According to one or more embodiments, in operation 730, the electronic device may determine a second application expected to be launched on at least one of the first display and the second display, based on at least one of a state of the electronic device, a usage history of the electronic device, and information related to the first application.

According to one or more embodiments, the state of the electronic device may launching state, a GPS connection state, and a mode setting state of the electronic device. For example, the display state may include an on/off state of each of the displays included in the electronic device. For example, the state of the display may include a form (e.g., a form factor) of the flexible display. In one or more examples, the mode setting state may include whether or not the electronic device is in a power saving mode and/or whether or not the electronic device is in a locked state.

According to one or more embodiments, the usage history of the electronic device may include at least one of a usage time, a place of use, a frequency of uses, a usage pattern, and a usage history of an application stored in the electronic device for a set period of time. For example, the usage history of the application may include a usage history of applications used in connection with each other and/or a usage history of an application used in a specific display, or a state thereof.

In one or more examples, the information related to the first application may include a type of the first application, a usage history of the first application, an application related to the first application, a current state of the first application, and/or a function being used by the first application.

In one or more examples, the electronic device may determine, as a second application, an application (e.g., an application that has been frequently launched after the first application had been launched) which is likely to be used after an application (e.g., the first application) is being launched. For example, the electronic device may determine, as the second application, an application which has been frequently used when a specific display switches from an off state to an on state. In one or more examples, when the display is in an off state, the electronic device may determine an application that has been launched prior to the off state as the second application.

According to one or more embodiments, the electronic device may determine the second application based on each of the displays included in the electronic device. For example, the electronic device may determine the second application expected to be launched on the first display, the second application expected to be launched on the second display, and/or the second application expected to be launched on both of the first display and the second display. In one or more examples, the electronic device may determine the second application expected to be launched on the second display independent of the first display being currently used, and/or the second application expected to be launched on both of the first display and the second display.

According to one or more embodiments, in operation 740, when a specified trigger condition is satisfied, the electronic device may perform a pre-loading process of at least a partial resource required for launching the second application. According to one or more embodiments, the trigger condition may include at least one of an on/off condition of the first display or the second display, a low-power mode operation condition of the electronic device, a communication activated condition of the electronic device, a condition related to the launching of the first application, and a GPS function activated condition of the electronic device.

For example, the electronic device may perform the pre-loading process of the second application when at least one of following events occurs: an event in which the first display and/or the second display switches from the off state to the on state or from the on state to the off state, an event in which the electronic device operates in the low-power mode, an event in which a specified function is being performed in the first application after a specified time has elapsed after the first application is launched, an event in which communication (e.g., Wi-Fi) of the electronic device is activated, and event in which a GPS function of the electronic device is activated. According to one or more embodiments, the pre-loading process may be an operation of pre-performing at least one launch process from among a plurality of launching processes related to an application. For example, the pre-loading process may be an operation of pre-loading a resource necessary for launching the application into a designated space of a memory. For example, launching of a pre-loaded application may be completed more rapidly than launching of a non-pre-loaded application may be.

According to one or more embodiments, the electronic device may not perform the pre-loading process of the second application when the determined second application is already launched in the electronic device (e.g., when the second application is already launched in the background). For example, a resource related to an application that is already launched may have been already loaded in the memory (e.g., a cache). In this case, the electronic device does not need to perform the pre-loading process to redundantly launch the previously loaded resource. Thus, the electronic device may not perform the pre-loading process on the second application even when the processor detects the trigger condition.

According to one or more embodiments, in operation 750, the electronic device may generate a launch screen of the second application in a virtual window corresponding to at least one of the first display and the second display, based on the pre-loaded resource. According to one or more embodiments, the electronic device may generate the virtual window corresponding to at least one of the first display and the second display on which the second application is expected to be launched (e.g., expected to display the launch screen of the second application thereon). For example, the electronic device may generate the launch screen of the second application in the generated virtual window based on the pre-loaded resource. In one or more examples, in operation 730, when the electronic device determines the second application based on each of displays included in the electronic device, the electronic device may generate a virtual window corresponding to each display, and may generate the launch screen of the determined second application in the corresponding virtual window. For example, the electronic device may generate the launch screen of the second application expected to be launched on the first display in the virtual window corresponding to the first display, or may generate the launch screen of the second application expected to be launched on the second display in the virtual window corresponding to the second display. The electronic device may further generate the launch screen of the second application expected to be launched on both of the first display and the second display in the virtual window corresponding to both of the first display and the second display.

According to one or more embodiments, the pre-loading process of the second application in operation 740 and the operation of generating the launch screen of the second application in the virtual window in operation 750 may be referred to as a pre-launching process of pre-launching the second application. For example, using the virtual window, the electronic device may pre-launch the second application expected to be launched, using the virtual window.

According to one or more embodiments, the electronic device may determine whether to provide information of the second application on a user interface that provides information of an application being launched based on a user setting. For example, the electronic device may provide the user interface that provides information on the application currently being launched based on the user input. For example, the user interface may include information about a recently launched application (e.g., recent app). According to one or more embodiments, the electronic device may determine whether to display the pre-loaded second application (or the pre-launched second application) as an application being launched on the user interface, based on the user setting.

According to one or more embodiments, the electronic device may determine whether a notification related to the second application is provided or whether a function of the second application is restricted, based on the user setting. For example, because the pre-loaded (or pre-launched) second application is not an application launched due to the user's direct selection thereof, the electronic device may determine whether to provide the notification related to the pre-loaded (or pre-launched) second application to the user, based on the user setting, and/or may determine whether the pre-loaded (or pre-launched) second application is allowed to use a specific function (e.g., a communication function (e.g., whether the second application is allowed to use communication data)), based on the user setting.

According to one or more embodiments, in operation 760, when the screen switch event occurs, the electronic device may display the launch screen of the second application generated in the virtual window on at least one display corresponding to the screen switch event among the first display and the second display and thus may complete the launching of the second application. According to one or more embodiments, the screen switch event may include an event (e.g., user input) for switching a display (or an area of the display) to be used while the launch screen of the first application is displayed on the first display. For example, the screen switch event may include at least one of an event for using the second display while using the first display, an event for using both of the first display and the second display while using the first display, or an event for launching another application on the first display.

According to one or more embodiments, the electronic device may determine whether the screen switch event is related to the second application. For example, when the screen switch event is related to the second application, the electronic device may display the launch screen of the second application on a corresponding display to complete the launching of the second application. When the screen switch event is not related to the second application, the electronic device may launch another application corresponding to the screen switch event.

According to one or more embodiments, when detecting the screen switch event, the electronic device may perform a remaining process (e.g., a process excluding the pre-loading process and the process of generating the launch screen in the virtual window) for launching the second application. According to one or more embodiments, the electronic device may display the launch screen of the second application generated in the virtual window on at least one display corresponding to the screen switch event. According to one or more embodiments, because the resource required for the launching of the second application may have already been pre-loaded and the launch screen of the second application may have already been generated, the electronic device may quickly display the launch screen of the second application on the display, and may reduce a time taken to complete the launching of the second application.

Figure 8:
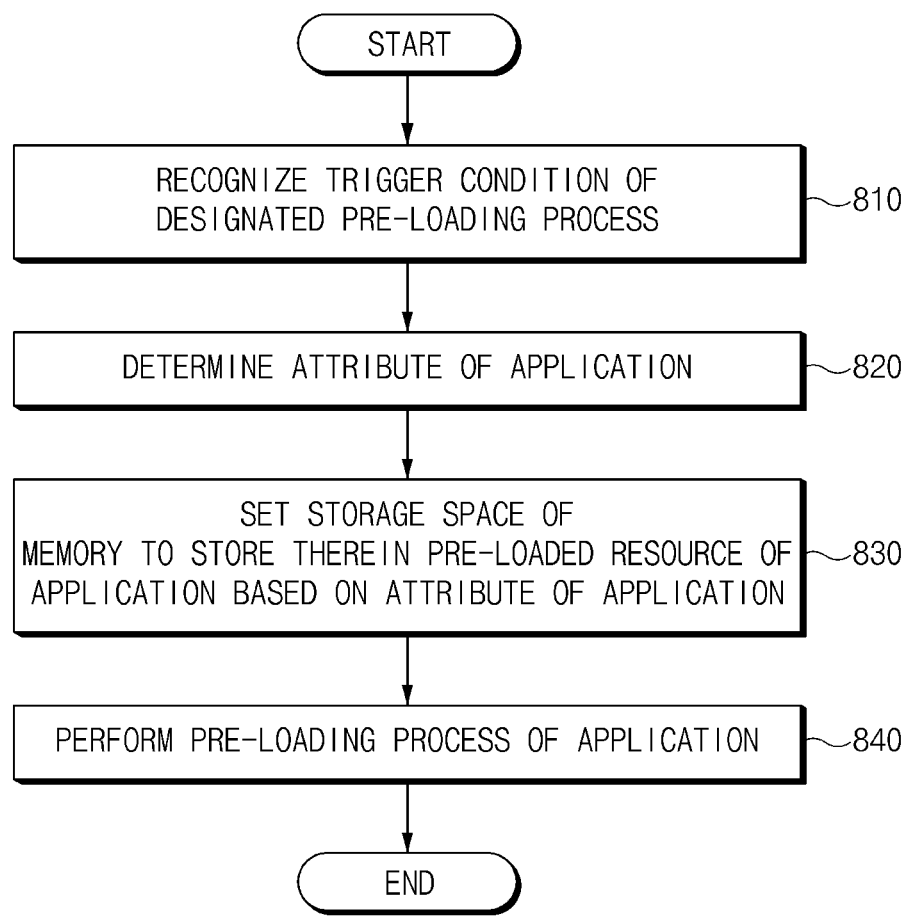
FIG. 8 is a flowchart of an application launching method of an electronic device, according to one or more embodiments.

FIG. 8 is a flowchart of an application launching method of an electronic device (e.g., the electronic device 101 in FIG. 1 or the electronic device 300 in FIG. 3) according to one or more embodiments. Hereinafter, descriptions duplicate with those as set forth above with reference to FIG. 7 are omitted or briefly described.

According to one or more embodiments, in operation 810, the electronic device may recognize a trigger condition of a designated pre-loading process. According to one or more embodiments, the trigger condition may include at least one of an on/off condition of the first display or the second display, a low-power mode operation condition of the electronic device, a communication activated condition of the electronic device, a condition related to the launching of the application, and a GPS function activated condition of the electronic device. According to one or more embodiments, the electronic device may have already determined the predicted application expected to be launched, based on at least one of the state of the electronic device, the usage history of the electronic device, or the information related to the first application.

According to one or more embodiments, in operation 820, the electronic device may determine an attribute of an application. For example, the electronic device may determine an attribute of a predicted application. In one or more examples, the electronic device may determine whether the predicted application uses a relatively large amount of a memory or a relatively small amount of the memory.

According to one or more embodiments, in operation 830, the electronic device may set a storage space (e.g., a memory slot) of the memory to store therein the pre-loaded resource of the application based on the attribute of the application. For example, the electronic device may limit a memory amount allocated to the application based on the attribute of the application. For example, when the predicted application uses a relatively large amount of the memory, the electronic device may limit the memory amount allocated to the predicted application.

According to one or more embodiments, in operation 840, the electronic device may perform a pre-loading process of an application. For example, the electronic device may store the pre-loaded application resource in the set storage space of the memory.

According to one or more embodiments, the electronic device may control a storage location of the memory and/or an allocation amount of the memory to be used when performing the pre-loading process of the predicted application, based on the attribute of the application and/or a current memory usage situation, thereby using the memory efficiently.

Figure 9:
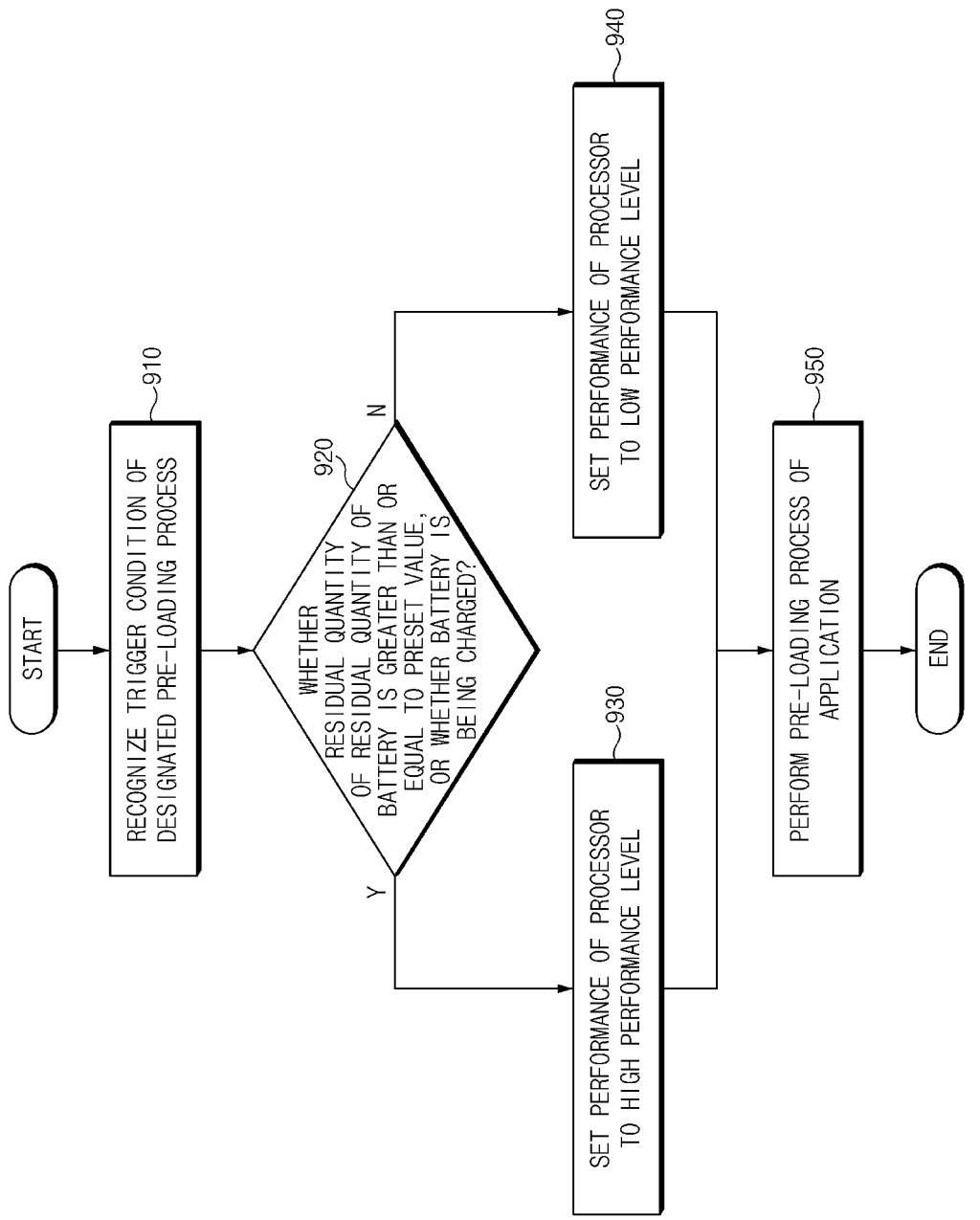
FIG. 9 is a flowchart of an application launching method of an electronic device, according to one or more embodiments.

FIG. 9 is a flowchart of an application launching method of an electronic device (e.g., the electronic device 101 in FIG. 1 or the electronic device 300 in FIG. 3) according to one or more embodiments. Hereinafter, descriptions duplicate with those as set forth above with reference to FIG. 7 and FIG. 8 are omitted or briefly described.

According to one or more embodiments, in operation 910, the electronic device may recognize a trigger condition of a designated pre-loading process. According to one or more embodiments, the trigger condition may include at least one of an on/off condition of the first display or the second display, a low-power mode operation condition of the electronic device, a communication activated condition of the electronic device (e.g., Wi-Fi connection), a condition related to the launching of the application, and a GPS function activated condition of the electronic device. According to one or more embodiments, the electronic device may have already determined the predicted application expected to be launched, based on at least one of the state of the electronic device, the usage history of the electronic device, or the information related to the first application.

According to one or more embodiments, in operation 920, the electronic device may determine whether a residual quantity of a battery is greater than or equal to a preset value, or whether the battery is being charged. According to one or more embodiments, the electronic device may perform operation 930 when the residual quantity of the battery is equal to or greater than the preset value or when the battery is being charged. According to one or more embodiments, the electronic device may perform operation 940 when the residual quantity of the battery is smaller than the preset value and the battery is not being charged.

According to one or more embodiments, in operation 930, the electronic device may set a performance of the processor to a high performance level. For example, the electronic device may set a resource (e.g., a CPU resource) of the processor to a relatively high level. In one or more examples, the electronic device may set a processing speed (e.g., a CPU clock) of the processor to a relatively high level. For example, the electronic device may assign at least one thread related to the predicted application to a high-performance core of the processor. For example, the processor may include the high-performance core having a relatively high-processing speed and a low-performance core having a relatively low-processing speed. For example, the low-performance core may include a low-power core that consumes relatively smaller power.

According to one or more embodiments, in operation 940, the electronic device may set the performance of the processor to a low performance level. For example, the electronic device may set the processor's resource (e.g., the CPU resource) to a relatively low level. In one or more examples, the electronic device may set the processor's processing speed (e.g., the CPU clock) to a relatively low level. In one or more examples, the electronic device may assign at least one thread related to the predicted application to the low-performance core (e.g., a low-power core) of the processor.

According to one or more embodiments, in operation 950, the electronic device may perform the pre-loading process of the application. For example, the electronic device may perform the pre-loading process of the application based on the set performance of the processor.

According to one or more embodiments, the electronic device may adjust the performance of the processor in charge of performing the pre-loading process of the predicted application, based on the state of the battery, thereby efficiently performing the pre-loading process.

A method for launching an application in the electronic device according to one or more embodiments of the disclosure may include launching a first application, displaying a launch screen of the first application on a first display of the electronic device, determining a second application expected to be launched on at least one of the first display or a second display of the electronic device, based on at least one of a state of the electronic device, a usage history of the electronic device, or information related to the first application, when a specified trigger condition is satisfied, performing a pre-loading process of at least a partial resource required for launching the second application, generating a launch screen of the second application in a virtual window corresponding to at least one of the first display or the second display, based on the pre-loaded resource, and when a screen switch event occurs, displaying the launch screen of the second application generated in the virtual window on at least one display corresponding to the screen switch event among the first display and the second display, thereby completing launching of the second application.

According to one or more embodiments, the pre-loading process is performed in a background.

According to one or more embodiments, the usage history of the electronic device may include at least one of a usage time, a place of use, a frequency of uses, a usage pattern of the electronic device, or a usage history of an application stored in the electronic device for a set temporal period.

According to one or more embodiments, the state of the electronic device may include at least one of a display state, a communication connection state, an application launching state, a GPS connection state, or a mode setting state of the electronic device.

According to one or more embodiments, the method may include setting a storage space of a memory to store therein the pre-loaded resource, based on an attribute of the second application.

According to one or more embodiments, the method may include controlling performance of a processor in charge of performing the pre-loading process, based on at least one of a residual quantity of a battery of the electronic device or whether or not the battery is being charged.

According to one or more embodiments, the method may include determining whether to provide information about the second application to a user interface providing information about an application being launched, based on a user setting.

According to one or more embodiments, the method may include determining whether to provide a notification related to the second application or to limit a function of the second application, based on a user setting.

According to one or more embodiments, the trigger condition may include at least one of an on/off condition of the first display or the second display, a low-power mode operation condition of the electronic device, a communication activated condition of the electronic device, a condition related to launching of the first application, or a GPS function activated condition of the electronic device.

A recording medium according to one or more embodiments of the disclosure may store therein computer-readable instructions, where when the instructions are executed by the electronic device, the instructions may cause the electronic device to launch a first application, display a launch screen of the first application on a first display of the electronic device, determine a second application expected to be launched on at least one of the first display or a second display of the electronic device, based on at least one of a state of the electronic device, a usage history of the electronic device, or information related to the first application, when a specified trigger condition is satisfied, perform a pre-loading process of at least a partial resource required for launching the second application, generate a launch screen of the second application in a virtual window corresponding to at least one of the first display or the second display, based on the pre-loaded resource, and when a screen switch event occurs, display the launch screen of the second application generated in the virtual window on at least one display corresponding to the screen switch event among the first display and the second display, thereby completing launching of the second application.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to one or more embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one or more embodiments, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one or more embodiments, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first display;
a second display;
a memory; and
a processor operatively connected to the first display, the second display, and the memory,
wherein the memory includes instructions, which upon execution by the processor, cause the processor to:
launch a first application,
display a launch screen of the first application on the first display,
determine a second application expected to be launched on at least one of the first display or the second display based on at least one of a state of the electronic device, a usage history of the electronic device, or information related to the first application,
based mining that a specified trigger condition is satisfied, perform a pre-loading process of one or more resources that are less than a plurality of resources required for launching the second application,
generate a virtual window corresponding to the at least one of the first display or the second display on which the second application is expected to be launched,
generate, based on the one or more resources that are pre-loaded, a launch screen of the second application the virtual window,
based on a screen switch event occurs, determine whether the screen switch event is related to the second application, and
based on determining that the screen switch is related to the second application display the launch screen of the second application generated in the virtual window on at least one display corresponding to the screen switch event among the first display and the second display, thereby completing launching of the second application.

2. The electronic device of claim 1, wherein upon execution of the instructions by the processor, the instructions cause the processor to perform the pre-loading process in a background such that pre-loading of the one or more resources is not visible while the launch screen of the first application is displayed.

3. The electronic device of claim 1, wherein the usage history of the electronic device includes at least one of a usage time, a place of use, a frequency of uses, a usage pattern of the electronic device, or a usage history of an application stored in the electronic device for a set temporal period.

4. The electronic device of claim 1, wherein the state of the electronic device includes at least one of a display state, a communication connection state, an application launching state, a GPS connection state, or a mode setting state of the electronic device.

5. The electronic device of claim 1, wherein upon execution of the instructions by the processor, the instructions cause the processor to set, based on an attribute of the second application, a storage space of the memory to store therein the one or more resources that are pre-loaded.

6. The electronic device of claim 1, wherein upon execution of the instructions by the processor, the instructions cause the processor to control, based on a battery condition, performance of the processor in charge of performing the pre-loading process, wherein the battery condition is based on at least one of a residual quantity of a battery of the electronic device or whether or not the battery is being charged.

7. The electronic device of claim 1, wherein upon execution of the instructions by the processor, the instructions cause the processor to determine, based on a user setting, whether to provide information about the second application to a user interface providing information about an application being launched.

8. The electronic device of claim 1, wherein upon execution of the instructions by the processor, the instructions cause the processor to determine, based on a user setting, whether to provide a notification related to the second application or to limit a function of the second application.

9. The electronic device of claim 1, wherein the specified trigger condition includes at least one of an on/off condition of the first display or the second display, a low-power mode operation condition of the electronic device, a communication activated condition of the electronic device, a condition related to launching of the first application, or a GPS function activated condition of the electronic device.

10. The electronic device of claim 1, wherein the first display and the second display constitute a single flexible display.

11. A method for launching an application in an electronic device, the method comprising:
launching a first application;
displaying a launch screen of the first application on a first display of the electronic device;
determining a second application expected to be launched on at least one of the first display or a second display of the electronic device, based on at least one of a state of the electronic device, a usage history of the electronic device, or information related to the first application;
based on determining that a specified trigger condition is satisfied, performing a pre-loading process of one or more resources that are less than a plurality of resources required for launching the second application;
generating a virtual window corresponding to the at least one of the first display or the second display on which the second application is expected to be launched;
generating, based on the one or more resources that are pre-loaded, a launch screen of the second application in the virtual window;
based on determining a screen switch event occurs, determining whether the screen switch event is related to the second application; and
based on determining that the screen switch event is related to the second application, displaying the launch screen of the second application generated in the virtual window on at least one display corresponding to the screen switch event among the first display and the second display, thereby completing launching of the second application.

12. The method of claim 11, wherein the pre-loading process is performed in a background such that pre-loading of the one or more resources is not visible while the launch screen of the first application is displayed.

13. The method of claim 11, wherein the usage history of the electronic device includes at least one of a usage time, a place of use, a frequency of uses, a usage pattern of the electronic device, or a usage history of an application stored in the electronic device for a set temporal period.

14. The method of claim 11, wherein the state of the electronic device includes at least one of a display state, a communication connection state, an application launching state, a GPS connection state, or a mode setting state of the electronic device.

15. The method of claim 11, wherein the method comprises setting, based on an attribute of the second application, a storage space of a memory to store therein the one or more resources that are pre-loaded.

16. The method of claim 11, wherein the method comprises controlling, based on a battery condition, performance of a processor in charge of performing the pre-loading process, wherein the battery condition is based on at least one of a residual quantity of a battery of the electronic device or whether or not the battery is being charged.

17. The method of claim 11, wherein the method comprises determining, based on a user setting, whether to provide information about the second application to a user interface providing information about an application being launched.

18. The method of claim 11, wherein the method comprises determining, based on a user setting, whether to provide a notification related to the second application or to limit a function of the second application.

19. The method of claim 11, wherein the specified trigger condition includes at least one of an on/off condition of the first display or the second display, a low-power mode operation condition of the electronic device, a communication activated condition of the electronic device, a condition related to launching of the first application, or a GPS function activated condition of the electronic device.

20. A non-transitory computer recording medium storing therein computer-readable instructions, which upon execution by a processor in an electronic device cause the processor to:
launch a first application;
display a launch screen of the first application on a first display of the electronic device;
determine a second application expected to be launched on at least one of the first display or a second display of the electronic device, based on at least one of a state of the electronic device, a usage history of the electronic device, or information related to the first application;

based on determining that a specified trigger condition is satisfied, perform a pre-loading process of one or more resources that are less than a plurality of resources required for launching the second application;

generate a virtual window corresponding to the at least one of the first display or the second display on which the second application is expected to be launched;

generate, based on the one or more resources that are pre-loaded, a launch screen of the second application in the virtual window corresponding;

based on determining a screen switch event occurs, determining whether the screen switch event is related to the second application; and based on determining that the screen switch event is related to the second application, display the launch screen of the second application generated in the virtual window on at least one display corresponding to the screen switch event among the first display and the second display, thereby completing launching of the second application.

\* \* \* \* \*